United States Patent
Kang et al.

(10) Patent No.: US 12,423,369 B2
(45) Date of Patent: Sep. 23, 2025

(54) SYSTEM AND METHOD FOR SCANNING FACES AND DISCOVERING SCHOLARY INFORMATION

(71) Applicant: Mohamed bin Zayed University of Artificial Intelligence, Abu Dhabi (AE)

(72) Inventors: Wong Yu Kang, Abu Dhabi (AE); Toluwani Aremu, Abu Dhabi (AE); Younes Balah, Abu Dhabi (AE); Abdulmotaleb El Saddik, Abu Dhabi (AE); Maryam Nadeem, Abu Dhabi (AE); Ivo Gollini Navarrete, Abu Dhabi (AE)

(73) Assignee: Mohamed bin Zayed University of Artificial Intelligence, Abu Dhabi (AE)

( * ) Notice: Subject to any disclaimer, the term of this patent is extended or adjusted under 35 U.S.C. 154(b) by 0 days.

(21) Appl. No.: 18/672,708

(22) Filed: May 23, 2024

(65) Prior Publication Data
US 2025/0094509 A1    Mar. 20, 2025

Related U.S. Application Data

(60) Provisional application No. 63/582,588, filed on Sep. 14, 2023.

(51) Int. Cl.
| | |
|---|---|
| *G06F 16/9535* | (2019.01) |
| *G06F 16/532* | (2019.01) |
| *G06F 16/951* | (2019.01) |
| *G06F 40/166* | (2020.01) |
| *G06V 40/16* | (2022.01) |

(52) U.S. Cl.
CPC ........ *G06F 16/9535* (2019.01); *G06F 16/532* (2019.01); *G06F 16/951* (2019.01); *G06F 40/166* (2020.01); *G06V 40/168* (2022.01)

(58) Field of Classification Search
CPC .. G06F 16/9535; G06F 16/532; G06F 16/951; G06F 40/166; G06V 40/168
See application file for complete search history.

(56) References Cited

U.S. PATENT DOCUMENTS

| 11,809,480 B1* | 11/2023 | Cheng | G06F 16/434 |
| 2017/0318077 A1* | 11/2017 | Borse | G06F 16/2455 |
| 2019/0012334 A1* | 1/2019 | Petrou | G06F 16/5838 |

(Continued)

FOREIGN PATENT DOCUMENTS

| CN | 114201658 B | 4/2022 |

OTHER PUBLICATIONS

Sadhana et al. ; Login and Information Retrieval System through Face Recognition ; International Journal of Advances in Engineering and Management (IJAEM) vol. 3, Issue 6 ; Jun. 2021 ; 6 Pages.

*Primary Examiner* — Dangelino N Gortayo
(74) *Attorney, Agent, or Firm* — Oblon, McClelland, Maier &Neustadt, L.L.P.

(57) ABSTRACT

A scholar system and method transforms search of academic knowledge. The system uses a combination of face recognition and language generation technology to effortlessly capture scholars in photos to give rich summaries of profiles of their work. The system also offers an interactive chat element for users to get more insights about a scholar, reducing online search efforts. The system ensures privacy and ethical compliance to rules and regulations.

20 Claims, 15 Drawing Sheets

(56) References Cited

U.S. PATENT DOCUMENTS

| | | |
|---|---|---|
| 2019/0108419 A1* | 4/2019 | Coven ........................ G06F 8/60 |
| 2020/0285839 A1* | 9/2020 | Donnenfeld .......... G06F 16/587 |
| 2021/0042527 A1* | 2/2021 | Ton-That ............... G06V 10/82 |
| 2022/0292149 A1 | 9/2022 | Gold |
| 2023/0018502 A1* | 1/2023 | Fu ....................... G06F 16/5854 |

\* cited by examiner

saad ibnsouda koraichi
Université Sidi Mohammed Ben Abdellah
Verified email at usmba.ac.ma
Biotechnologie

MUHAMMAD SAAD
Anonymous
Programming   Hardware Engineering

Dr. Mohammad Saad Alam
IEEE
Verified email at ieee.org
Blockchain   Cryptocurrency Energy Manage...   Big Data Analytics
Transactive Energy   EV Charging Infrastructure

Mohammed Saad Lahlou
Professor Titular-livre de Fisiologia, Universidade Federal do Ceará
Verified email at ufc.br
Hipertensão arterial pulmonar   Infarto de miocárdio

Haitham Saad Mohamed Ramadan
ISTHY, France
Verified email at isthy.fr
Hydrogen and Fuel Cells   Renewable Energy
Energy Storage Systems   Power System Control

Muhammad Saad Hassan
Research Scholar at Beijing Institute of Technology
Verified email at bit.edu.cn
Machine Learning   Deep Learning   Human Pose Estimation
Virtual Reality   Feature Extraction

Saad Gomaa Mohamed
Tabbin Institute for Metallurgical Studies (TIMS), Cairo, Egypt.
Verified email at tims.gov.eg
Electrochemistry   Energy Storage Materials   Nanomaterials

FIG. 1

Abdulmotaleb El Saddik

University of Ottawa, MBZUAI
Verified email at uottawa.ca - Homepage
Immersive Media  Quality of Experience  Digital Twins  Multimedia Communication  Metaverse

☑ FOLLOW

| TITLE | CITED BY | YEAR |
|---|---|---|
| Multimodal fusion for multimedia analysis: a survey<br>PK Atrey, MA Hossain, A El Saddik, MS Kankanhalli<br>Multimedia systems 16, 345-379 | 1305 | 2010 |
| Digital twins: The convergence of multimedia technologies<br>A El Saddik<br>IEEE MultiMedia 25 (2), 87-92 | 793 | 2018 |
| C2PS: A digital twin architecture reference model for the cloud-based cyber-physical systems<br>KM Alam, A El Saddik<br>IEEE access 5, 2050-2062 | 698 | 2017 |
| An overview of serious games<br>F Laamarti, M Eid, AE Saddik<br>International Journal of Computer Games Technology 2014, 11-11 | 691 | 2014 |

FIG. 2

| | | |
|---|---|---|
| Toward social internet of vehicles: Concept, architecture, and applications<br>KM Alam, M Saini, A El Saddik<br>IEEE access 3, 343-357 | 421 | 2015 |
| Evaluating and improving the depth accuracy of Kinect for Windows v2<br>L Yang, L Zhang, H Dong, A Alelaiwi, A El Saddik<br>IEEE Sensors Journal 15 (8), 4275-4285 | 396 | 2015 |
| Open Java: von den Grundlagen zu den Anwendungen<br>S Fischer, A El Saddik<br>Springer Berlin Heidelberg | 320 * | 1999 |
| The Potential of Haptics Technologies<br>A El Saddik<br>IEEE instrumentation & measurement magazine 10 (1), 10-17 | 290 | 2007 |
| A survey of RST invariant image watermarking algorithms<br>D Zheng, Y Liu, J Zhao, AE Saddik<br>ACM Computing Surveys (CSUR) 39 (2), 5 | 279 | 2007 |
| RST-invariant digital image watermarking based on log-polar mapping and phase correlation | 264 | 2003 |

FIG. 2 (Cont'd)

Welcome to ScholarFace

About

Abdulmotaleb El Saddik
https://scholar.google.com/citations?hl=en&user=VcOjngAAAAJ
University of Ottawa, MBZUAI Summary Abdulmotaleb El Saddik is the *Acting Department Chair of Computer Vision* and a *Professor of Computer Vision* at *Mohamed bin Zayed University of Artificial Intelligence (MBZUAI)*. Before joining MBZUAI, he served as a **Distinguished University Professor* and *University Research Chair* in the School of Electrical Engineering and Computer Science at the *University of Ottawa*. El Saddik's research focus is on the establishment of digital twins to enhance the quality of life of citizens using artificial intelligence (AI), as well as multimedia computing and communications, and extended reality (XR) including haptics/AR/VR. He has supervised more than 150 researchers.

Learn More
https://mbzuai.ac.ae/study/faculty/Professor-Abdulmotaleb-El-Saddik/

FIG. 11

SYSTEM AND METHOD FOR SCANNING FACES AND DISCOVERING SCHOLARY INFORMATION

CROSS REFERENCE TO RELATED APPLICATION

The present application claims benefit of priority to U.S. Provisional Application No. 63/582,588 having a filing date of Sep. 14, 2023, which is incorporated herein by reference in its entirety.

STATEMENT REGARDING PRIOR DISCLOSURE BY THE INVENTORS

Aspects of this technology are described in Wong, Yu Kang, Aremu, Toluwani, Balah, Younes, Nadeem, Maryam, Navarette, Ivo, El Saddik, Abdulmotaleb. (2023). "Scholar-Face: Scanning Faces, Discovering Minds" 10.36227/techrxiv.170290975.55367595/v1, and is herein incorporated by reference in its entirety.

BACKGROUND

Technical Field

The present disclosure is directed to a system and method for scanning faces of scholars to obtain summaries of academic achievements. The system and method include an interactive question-answer system to obtain information about the scholars.

Description of Related Art

In today's rapidly evolving landscape of information, navigating the vast sea of academic research and scholarly articles by numerous researchers requires a reliable compass. This is where academic search engines emerge as indispensable tools for both students and researchers. Academic search engines are a specialized online platform designed to facilitate the discovery and retrieval of academic content. While various search engines such as ORCID, ResearchGate, and Semantic Scholar exist, the most widely recognized one remains Google Scholar.

In essence, while academic search engines have a long-standing presence, there has been minimal improvement in the manner in which they facilitate user searches. The conventional platforms are lacking in some essential features. Conventional search platforms are limited to text-only searches and are ambiguous in researchers' names.

As in FIG. 1, conventional academic search engines offer exclusively text-based search capabilities. The users are constrained to conducting searches based solely on text input (e.g., names, published papers or manually sifting through the names in relevant field). When users search the researcher's name, they might encounter multiple researchers sharing the same name.

Also, as in FIG. 2, conventional search platforms lack contact information and do not provide profile summaries. In the absence of additional details like affiliation, profile image, or field of expertise, pinpointing the desired researcher becomes a challenging task.

Notably, widely used search engines like Google Scholar do not provide researchers' email addresses or contact information. Users must take extra step to navigate the respective university's homepage to access the necessary contact information they aim to engage with, thereby elongating the process of establishing connections and collaborations.

Furthermore, conventional academic search engines lack the capability to provide summaries. When a user seeks information about a specific researcher, they must sift through the researcher's entire publication history to ascertain their past contributions. This task becomes even more challenging if the researcher is highly prolific and has amassed a substantial number of publications, making the navigation process cumbersome.

Accordingly, it is one object of the present disclosure to provide methods and systems for addressing inefficiencies of conventional scholar search, including harnessing the synergy of face recognition and language generation technologies for efficient retrieval of scholar information. An object is a method of capturing images of scholars in live environments, such as conferences, and utilize AI to recognize scholars in real time. An object is to refine generative language models to automatically generate comprehensive summaries based on most current scholar information. An object is an interactive element to offer users insights into academic achievements and affiliations of scholars identified by the image, reducing online search efforts. Further, the system and method prioritizes ethics, following strict privacy measures for responsible facial recognition use in scholarly information retrieval.

SUMMARY

One aspect of the invention is a scholar information retrieval system that includes a memory storing vectors of facial embeddings and associated links to scholar profiles; and processing circuitry configured to input a face image of a scholar, recognize, by a facial recognition model, the face image and generate a live facial embedding, search, in the memory, for vectors of facial embeddings matching the live facial embedding to obtain one or more links to scholar profiles related to the scholar, generate an academic summary for the scholar based on the scholar profiles, and display the academic summary for the scholar.

In another aspect the invention includes a chat service that is configured to perform a question-answer interaction with a user, in which the answers are generated by a large learning model trained for question-answering based on the obtained content.

In another aspect of the invention the facial recognition model takes as input a live face image transferred directly from a camera.

In another aspect of the invention the scholar profiles are associated with a facial image are periodically updated.

In another aspect the invention further includes a user registration module, in which the facial embeddings are extracted for a scholar face image to serve as a search key in the vector database.

A further aspect of the disclosure is a scholar information retrieval system, that can include a memory storing links to scholar profiles; and processing circuitry configured to input a face image of a scholar, recognize, by a facial recognition model, the face image to generate a facial embedding, retrieve, from the memory, one or more links to scholar profiles related to the scholar matching to stored facial embeddings, generate an academic summary for the scholar based on the scholar profiles, and display the academic summary A further aspect of the disclosure is a non-transitory computer-readable storage medium including computer executable instructions, wherein the instructions, when executed by a computer, cause the computer to perform a method for scholar information retrieval in a mobile device, the method can include storing vectors of facial embeddings and associated links to scholar profiles; inputting a face image of a scholar; recognizing, by a facial recognition model, the face image and generate a live facial embedding; searching for vectors of facial embeddings matching the live facial embedding to obtain one or more links to scholar profiles related to the scholar; generating an academic summary for the scholar based on the scholar profiles; and displaying the academic summary for the scholar.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 illustrates results of a conventional search engine;

FIG. 2 illustrates results of selection of a search item among search results;

DETAILED DESCRIPTION

Figure 3:
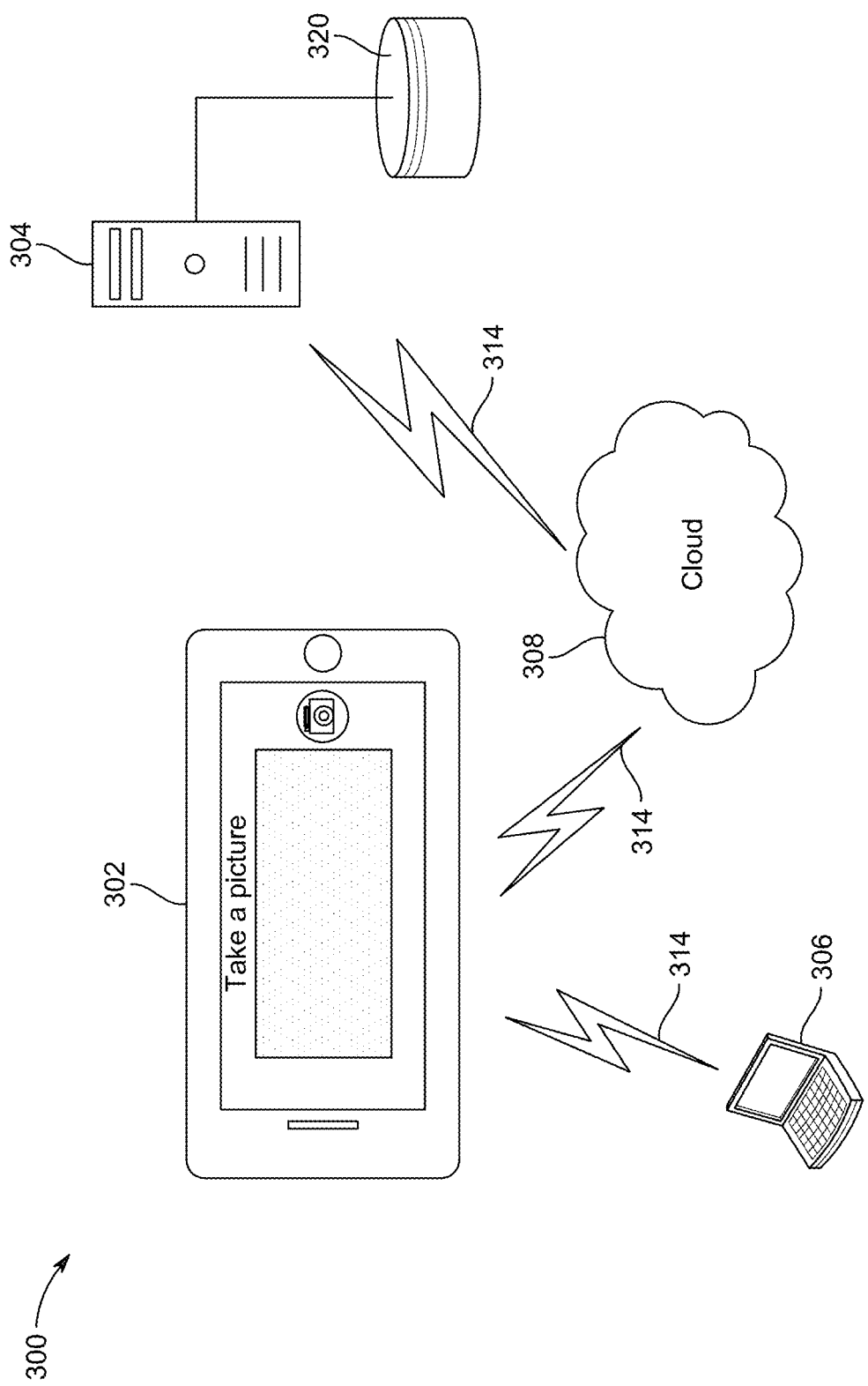
FIG. 3 is a system diagram for a scholar scanning and scholar information retrieval.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system, device, and method for utilizing image-based input for searches for scholar information. The system, referred to as ScholarFace, employs sophisticated facial recognition technology to precisely identify scholars. The system and method reduces ambiguity in researchers' names. ScholarFace encourages scholars to provide valid and up-to-date facial profiles and other information such as affiliations. The system and method utilizes language generation technology to generate detailed summaries of scholar's work. Furthermore, the system and method offers user-friendly chat functionalities for supplementary insights. The system and method facilitates collaboration and networking, by encouraging collaboration and networking among scholars and by displaying the up-to-date contact information to users.

For purposes of this disclosure, the term scholar refers to a person who has extensively studied a subject and knows a lot about it. A scholar is an intelligent and well-educated person who knows the particular subject very well, as demonstrated through peer-reviewed publications pertaining to that subject and/or professional title, professorship at a college or university, or public reputation as an expert on a subject.

FIG. 3 is a system diagram for a scholar scanning and scholar information retrieval. In one embodiment, a camera-equipped mobile device 302 may be used to capture the image of a scholar during an academic event, such as a conference or networking event. Face recognition may be performed within the mobile device. Alternatively, the captured image may be sent to an external device for face recognition, such as a laptop computer 306 or the cloud 308. A database of scholar information can be maintained in a database system 320 managed by a database server 304. Communication between devices and the cloud is over the Internet 314, via wireless communication, e.g., WiFi, Bluetooth, and cellular, or wired communication via Ethernet.

The ScholarFace system embodies a meticulously designed systematic process, employing cutting-edge technologies to process facial data and retrieve scholar profiles based on the facial data. Initially, the process involves extracting facial embeddings from a scanned/captured facial image, enabling precise identification and association with the corresponding scholar profile stored within a comprehensive database. This initial step lays the groundwork for a refined and accurate representation of the individual in focus.

Subsequently, the acquired facial embeddings serve as the foundation for an advanced language model to weave a comprehensive tapestry of the scholar's academic journey. With the prowess of natural language generation, the language model crafts a detailed and insightful summary encapsulating the scholar's notable achievements, groundbreaking research contributions, and affiliations within the academic sphere. This generated summary stands as a testament to ScholarFace's dedication to providing users with a holistic understanding of the scholar's scholarly endeavors.

The culmination of this intricate process lies in the seamless presentation of the comprehensive academic summary as the final output. By orchestrating this seamless integration of facial recognition technology, advanced language models, and a vast repository of scholarly information, ScholarFace empowers users with an efficient and intuitive means to access rich scholarly knowledge. ScholarFace aims to revolutionize scholarly information retrieval as a transformative tool and foster a more interconnected and informed global academic community.

An embodiment includes an application and/or API that is attachable and deployable to social media platforms, such as Telegram, WhatsApp, and others. An embodiment includes a robust application base that can be linked with other systems which can contribute to an organized research-directed resource for academia and industry.

Figure 4:
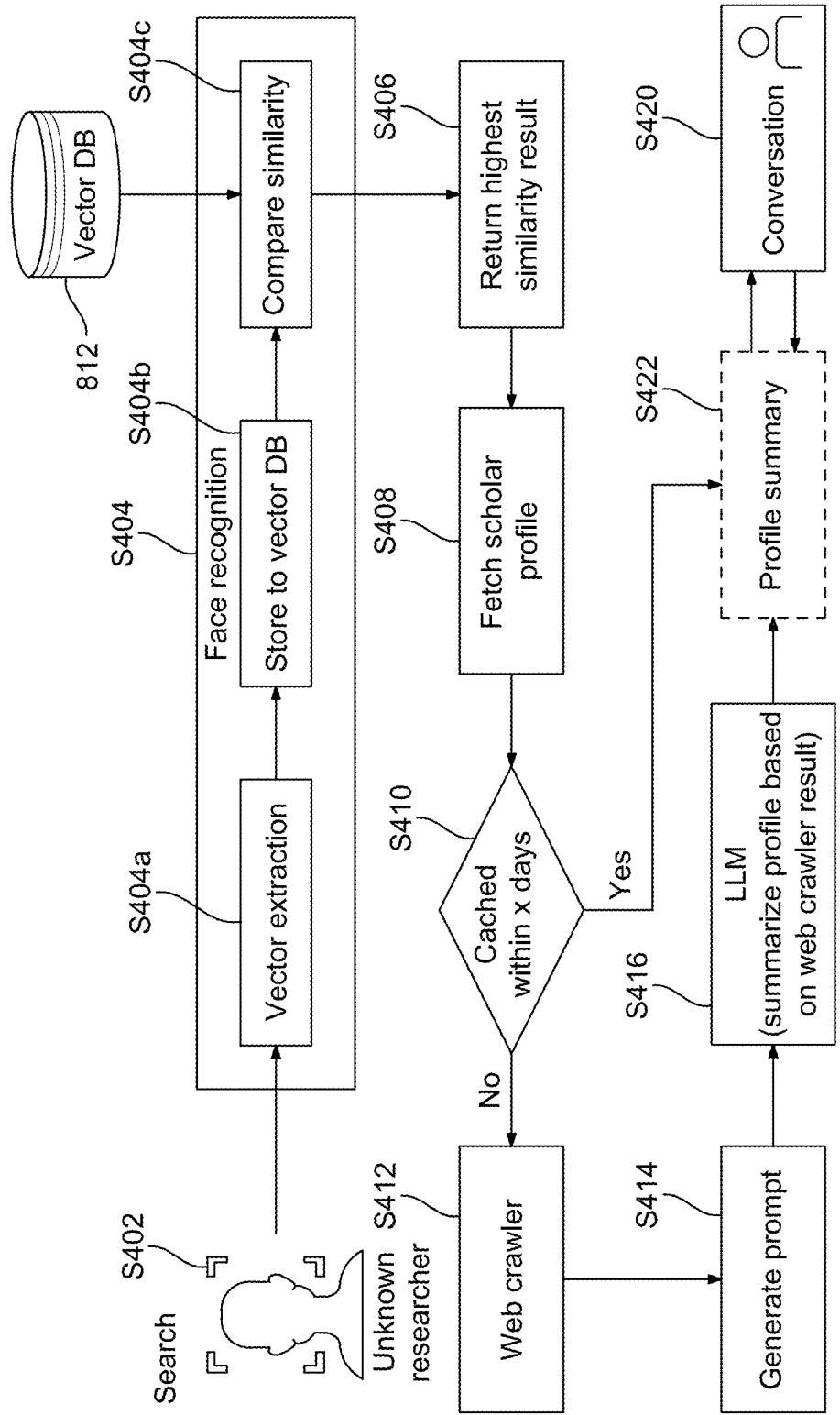
FIG. 4 is a flowchart for a method of obtaining a summary of scholar profile based on capturing a face image of an unknown scholar.

FIG. 4 is a flowchart for a method of obtaining a summary of a scholar profile based on a captured face image of the scholar. ScholarFace systematically processes facial data, using embeddings from scanned/captured images to fetch scholar profiles from a database. A task specific language model generates comprehensive academic summaries as output, providing efficient access to rich scholarly information.

A. Face Recognition

The history of Neural Network based face recognition traces back to the early developments in the late 1980s and 1990s. These pioneering efforts laid the groundwork for applying neural network architectures to the challenging task of face recognition. One of the earliest successes was the "Eigenfaces" method, introduced by Sirovich and Kirby, and used by Turk and Pentland in 1991, which employed Principal Component Analysis (PCA) to extract facial features. See L. Sirovich and M. Kirby, "Low-dimensional procedure for the characterization of human faces," J. Opt. Soc. Am. A 4, 519-524 (1987); and M. A. Turk and A. P. Pentland, "Face recognition using eigenfaces," Proceedings. 1991 IEEE Computer Society Conference on Computer Vision and Pattern Recognition, Maui, HI, USA, 1991, pp. 586-591, doi: 10.1109/CVPR.1991.139758, each incorporated herein by reference in their entirety.

In the following years, advancements in neural network models, particularly the emergence of deep learning, led to substantial improvements in face recognition accuracy and performance. The seminal work of DeepFace by Facebook in 2014 demonstrated the potential of deep convolutional neural networks (CNNs) for highly accurate and scalable face recognition. See Y. Taigman, M. Yang, M. Ranzato and L. Wolf, "DeepFace: Closing the Gap to Human-Level Performance in Face Verification," 2014 IEEE Conference on Computer Vision and Pattern Recognition, Columbus, OH, USA, 2014, pp. 1701-1708, doi: 10.1109/CVPR.2014.220, incorporated herein by reference in its entirety. Since then, neural network-based face recognition has seen rapid progress, driven by the availability of large-scale datasets, powerful computational resources, and continuous innovations in network architectures. Currently, this technology has become integral to various applications, from biometric authentication to intelligent surveillance systems, heralding a new era of efficient and robust face recognition systems.

ScholarFace utilizes embeddings generated by a face recognition model as the input for a large language model for generation of a scholar summary. Subsequently, face recognition is a pivotal component of ScholarFace, being a system designed to revolutionize the discovery and access of scholarly information. By capturing a scholar's photograph, the system swiftly and accurately matches the facial features against a vast database of scholars. This enables seamless identification, even in dynamic scenarios like conferences and networking events, where capturing valuable academic connections is paramount. The efficacy of face recognition within ScholarFace is bolstered by meticulous design choices and advanced algorithms. Rigorous evaluations also ensure the system can effectively process diverse facial appearances, accounting for lighting conditions, facial expressions, and angle variations.

Privacy and ethical considerations are paramount in the development of ScholarFace. ScholarFace safeguards individuals' rights and personal data. The system strictly adheres to robust privacy protocols when deployed, ensuring responsible usage of face recognition technology. There is a need to balance the convenience of accessing scholarly information and protecting users' privacy. More design choices to maximize user security are described later.

Referring to FIG. 4, in S402, a mobile device configured with a camera, a camera, or a video camera, may be used to capture an image of an unknown scholar. The distance to the scholar can be far enough that the scholar is not distracted by the picture taking event, but close enough to obtain a high-resolution image of the scholar's face, as the primary object in the image. The unknown scholar may be informed by the user that their photograph is being taken to help to get to know the scholar better. In an embodiment, the scholar has been registered with ScholarFace, which includes an understanding that certain professional information would be made available in association with a face image.

In S404, the face recognition model generates a facial embedding. In S404a, a face embedding is a vector that represents features of a face image. In one embodiment, the system discards the face image after generation of the facial embedding.

Figure 5:
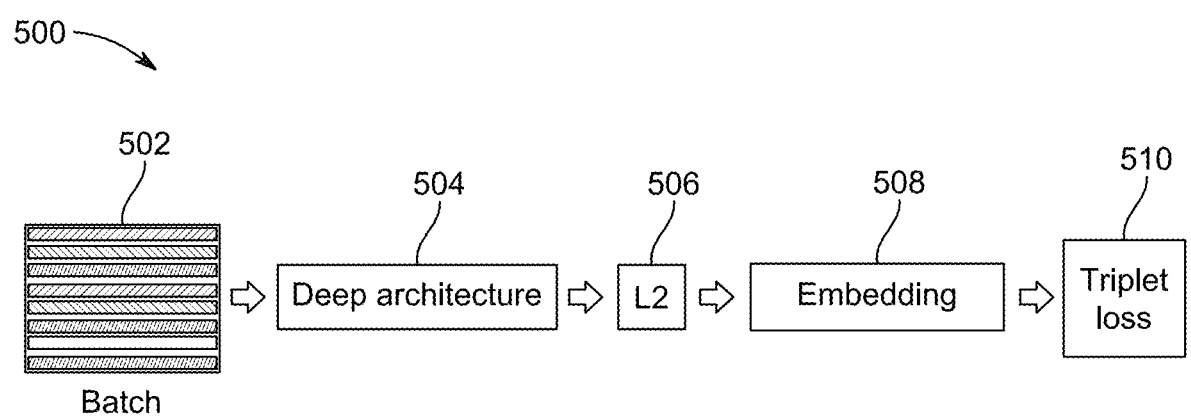
FIG. 5 is a block diagram for a non-limiting face recognition deep learning network.

FIG. 5 is a block diagram for a non-limiting face recognition deep learning network. The face recognition network 300 can be trained by a batch input 502. The face recognition network 500 includes a deep neural network architecture for image recognition, which has generally taken the form of a convolutional neural network (CNN) architecture 504. The CNN 504 passes output to a L2 normalization 506, which results in the face embedding 308. During training, the face embedding is passed to a loss function 510. An example of the face recognition network 500 is FaceNet. As mentioned herein, other face recognition models are possible.

The system can generate a scholar profile summary for an unknown researcher. When the system identifies the researcher in the image, it extracts the name and affiliation from the secure database. This name and affiliation are then used to generate a profile summary using publicly available resources like personal website, Google Scholar, university profiles, and others.

A profile summary of the researcher can be obtained by Face embeddings that are n-dimensional vectors pertaining to facial features, and generally have lengths of 128, 512, and others. The vector dimension involves a tradeoff. The smaller the vector size of faces, the faster the system, but then the performance could get compromised. A preferred vector dimension is 512 that is not necessarily large but guarantees performance. The face embedding 508 is used as a key in a database. In embodiments, face images are not stored in a scholar database 812. Instead, in S404b, face embeddings are stored in the vector database. In S402, a user starts by capturing an image of an unknown researcher. In S404, this image is processed by the face recognition model, which, in S404c, compares the face embedding to face vectors stored in the scholar database 812, and in S406 identifies the person with the highest similarity and returns their name.

The system can handle different ways of writing a scholar's name, for example, cases where a name may alternatively be in the form of four or more parts or initials.

However, in an embodiment, the system uses the name and affiliation to generate results. The system can handle minimal to moderate variations in a registered name, such as initials or missing a middle name.

In S408, the system then retrieves the person's profile. If the profile is cached (YES in S410), indicating a previous retrieval, in S422, the system promptly retrieves the profile summary. Otherwise (NO in S410), in S412, a Web crawler gathers information from the internet based on the Scholar Profile link. Subsequently, in S414, the system concatenates the crawled data with a predetermined prompt and submits it to the Large Language Model (LLM) to, in S416, generate the final profile summary. If the user seeks more information, in S420, they can engage in a conversation with the LLM.

In one embodiment, if the face embedding of the unknown user does not match any face vectors stored in the scholar database 812, the unknown researcher may be sent an invitation to register a new user. For example, an unknown researcher may be given a website to go to to register with the ScholarFace system.

B. Generative Language Technology

Once a scholar is accurately identified through face recognition, ScholarFace seamlessly retrieves comprehensive profiles containing vital academic information. In a proof-of-concept, to enhance the user experience, the Microsoft Bing Chat API is the large language model for summary retrieval that is used to generate scholar summaries and relevant insights into scholars' academic achievements, research contributions, and affiliations.

Microsoft Bing Chat API is currently based on ChatGPT (Chat Generative Pre-Trained Transformer). ChatGPT is based on a Transformer architecture. It is a neural network architecture for processing sequential data, such as text. The Transformer architecture is based on self-attention mechanisms, which allow the model to weigh the importance of different parts of the input sequence when making predictions.

Figure 6:
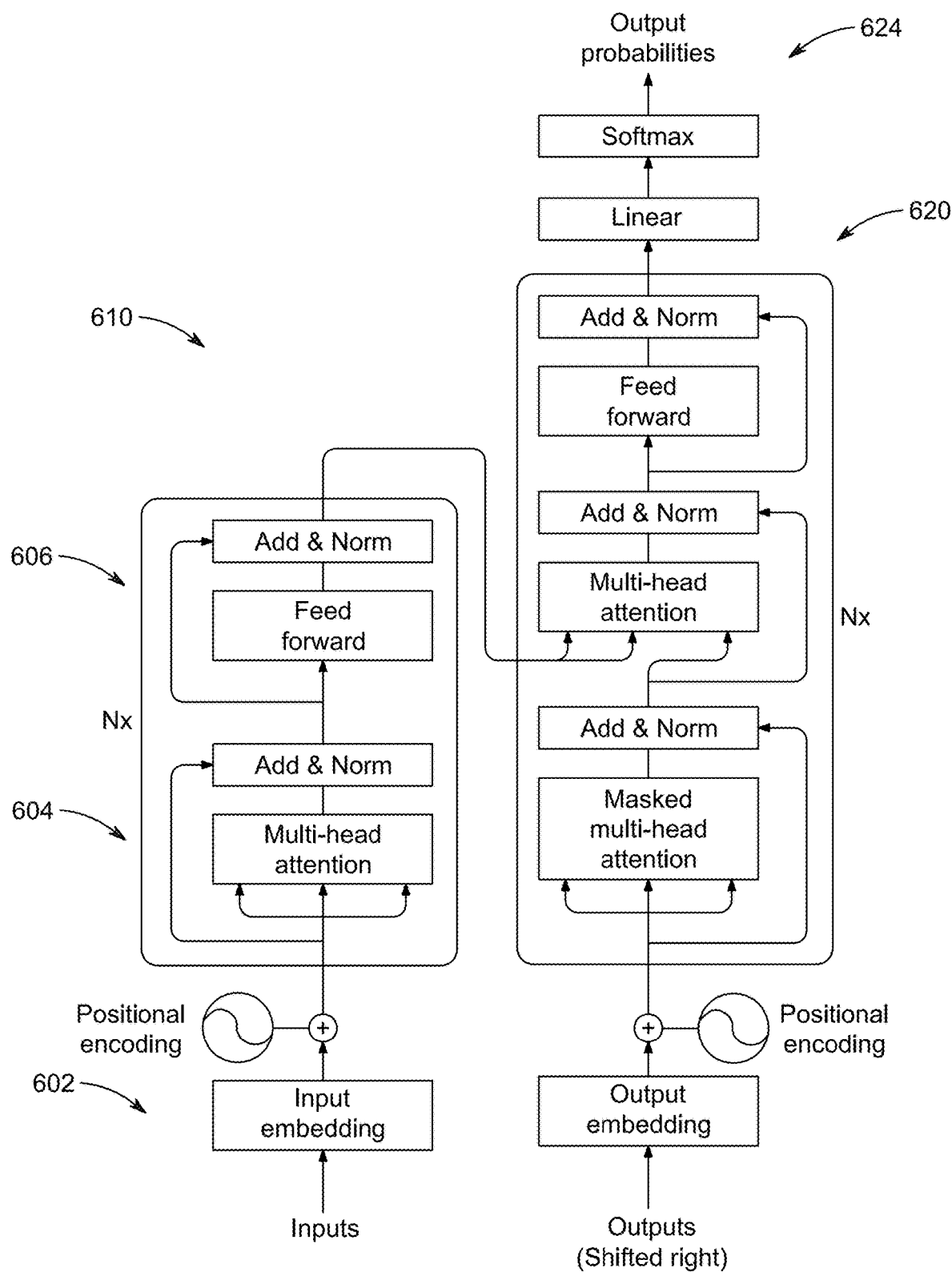
FIG. 6 is a block diagram of a non-limiting architecture for a large language model.

FIG. 6 is a block diagram of a non-limiting architecture for a large language model (LLM).

The system uses prompts for training the large language model (LLM). Some prompt examples include, "Use langchain tool to do this task. Who is {name} from {affiliation}? Give me a summary of what they are working on."

In some implementations, the system has encountered a problem in which there is a rare mix up or hallucination of a scholar's profile. In such cases, fine-training is performed for the LLM.

In FIG. 6, a transformer architecture 600 takes as input, an input sequence of tokens (e.g., words or sub-words) that represent the text input.

The first step in transformation is to convert the input sequence into a matrix of vectors, where each vector represents a token in the sequence. This process is called input embedding. The input embedding layer 602 maps each token to a high-dimensional vector that captures the semantic meaning of the token.

The self-attention mechanism allows the model to compute relationships between different parts of the input sequence. It consists of three steps: query, key, and value computations, and attention computation. In the query, key, and value computations, the input vectors are transformed into three different representations using linear transformations. In the attention computation step, the model computes a weighted sum of the values, where the weights are based on the similarity between the query and key representations. The weighted sum represents the output of the self-attention mechanism for each position in the sequence.

The Transformer architecture 600 uses multi-head self-attention 604, which allows the model to focus on different parts of the input sequence and compute relationships between them in parallel. In each head, the query, key, and value computations are performed with different linear transformations, and the outputs are concatenated and transformed into a new representation.

The output of the multi-head self-attention mechanism 604 is fed into a feedforward network 606, which consists of a series of fully connected layers and activation functions. The feed forward network 606 transforms the representation into the final output.

The transformer architecture 600 includes other function layers including layer normalization, positional encoding, and stacking layers.

Figure 7:
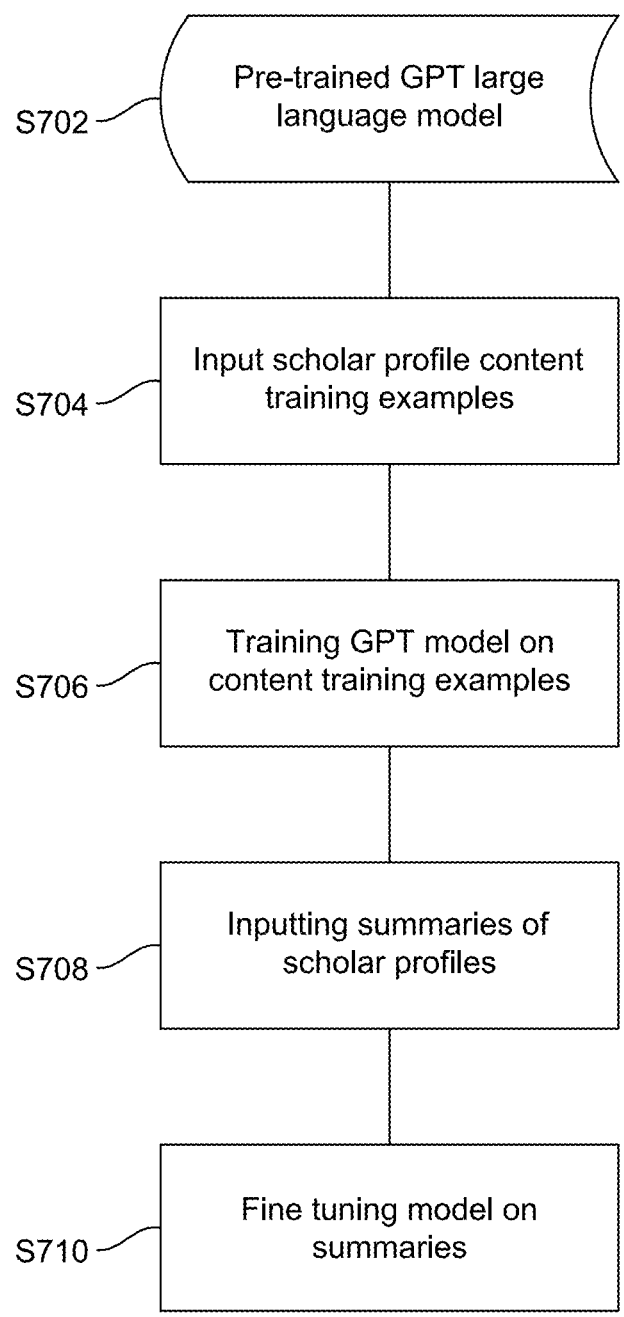
FIG. 7 is a flowchart for training a large language model for summarization, in accordance with an exemplary aspect of the disclosure.

FIG. 7 is a flowchart for training a large language model for summarization. In one embodiment, a pretrained large language model is fine tuned to generate summaries of scholar profiles. In S702, a pre-trained GPT large language model is used as a baseline model. In one embodiment, the Microsoft Bing Chat API is used as a baseline. In order to train the large language model to generate scholar profile summaries, in S704, scholar profile content is input to the baseline model as input training examples. In S706, the baseline model is trained on the content training examples. In S708, summaries of the scholar profiles are input, and in S710, the model is fine-tuned on the scholar profile summaries. Subsequently, the original large language model is now configured to generate scholar profile summaries.

Aside from generation of scholar profile summaries, the baseline large language model is fine-tuned for question-answering chat. ScholarFace enables users to engage in LLM Powered Chat, allowing them to ask questions and obtain more information about other users.

Figure 8:
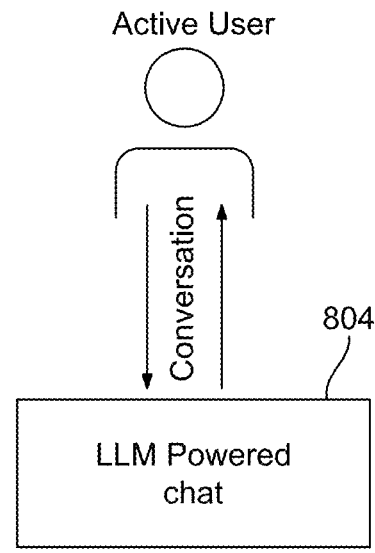
FIG. 8 is a use case of a large language model for question-answering, in accordance with an exemplary aspect of the disclosure.

FIG. 8 is a use case of a large language model for question-answering. The Microsoft Bing Chat API offers a conversational AI chatbot feature for Bing's search engine, enabling users to interact with an AI chatbot instead of typing search queries. Powered by OpenAI's GPT-3.5 or GPT-4 language model and Bing's search rank algorithm, this powerful tool can answer questions, generate text, and assist with creative tasks. In one embodiment, the Microsoft Bing Chat API is fine-tuned for question-answering for scholar information 804.

Figure 9:
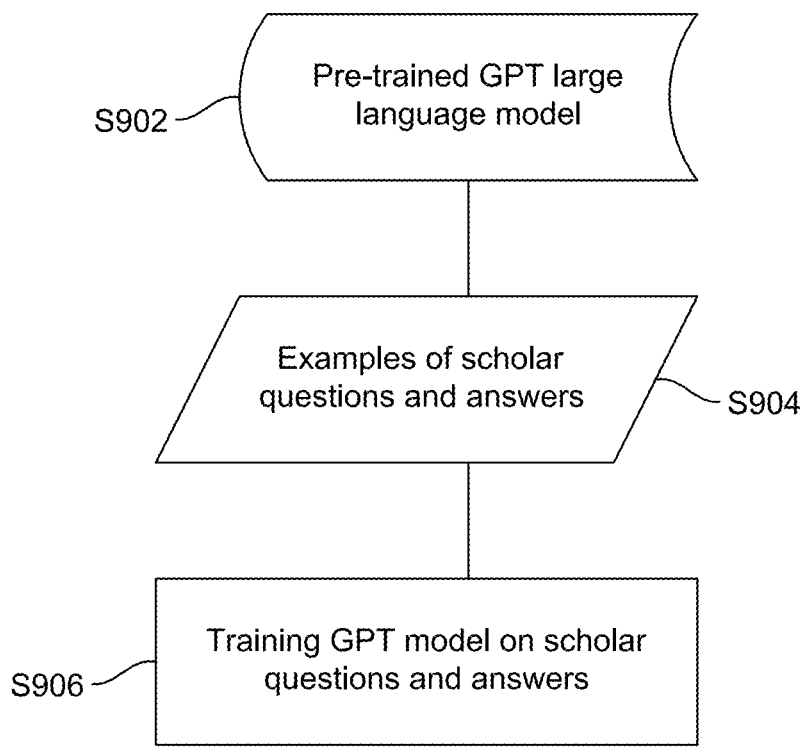
FIG. 9 is a flowchart for training a large language model for question-answering, in accordance with an exemplary aspect of the disclosure.

FIG. 9 is a flowchart for training a large language model for question-answering. Starting, in S902, with a pretrained large language model, in S904, examples of scholar questions and answers are used to fine-tune the pretrained GPT model on a dataset of scholar questions and answers in S906. The scholar question-answer training data is in the form of a prompted format. A prompted format includes a specified prompt and ideal generated text. An example prompt format is:
{"prompt": "<prompt text>", "completion": "<ideal generated text>"}

In one embodiment, the specified prompt is a question and the completion portion is an ideal answer to the prompted question. Some example prompts are questions shown below. The GPT model learns to complete an input prompt.

The integration of face recognition and generative language models in ScholarFace represents a synergistic approach towards achieving a mission of empowering researchers, academics, and knowledge seekers. By bridging facial identification and scholarly information retrieval, the system paves the way for seamless access to academic knowledge and fosters meaningful collaborations within the global scholarly community.

C. Ethical Framework

As ScholarFace continues to grow, an unwavering commitment to upholding the highest standards of privacy, ethics, and technological innovation remains at the core. A goal is to create a transformative tool that simplifies scholarly information discovery and embodies the responsible use of emerging technologies for the greater benefit of academia. To achieve this, an extensive set of ethical design policies have been curated that are followed to ensure the utmost protection and integrity of user data:

Data Collection Integrity: the privacy and consent of users is ensured. ScholarFace will never extract or crawl image data from the internet without explicit user consent. Facial data will solely be obtained from users who willingly sign up for the application, ensuring the ethical handling of personal information.

User Control: Transparency and user agency are fundamental principles in the ethical framework. For users of ScholarFace, the option is provided to control access to their information by allowing them to opt-out of facial data-based profile sharing. Respecting user autonomy is paramount to building trust and maintaining ethical standards.

Data Security: To safeguard the privacy of users, state-of-the-art cryptographic algorithms encrypt the database. ScholarFace will only store facial embeddings derived from the user's live face image, preventing unauthorized access to raw data and promoting secure data handling practices. In one embodiment, ScholarFace deletes the face image after generation of the facial embedding.

Regular Facial Profile Updates: To enhance the accuracy and validity of facial recognition, users will be prompted to update their live facial profiles every six months. This proactive measure ensures precise identification and prevents potential inaccuracies over extended periods of use.

Rigorous User Validation: To mitigate the risk of impersonation and ensure the credibility of user profiles, ScholarFace conducts both automatic and manual validation of users' information. The system is fortified against potential fraudulent activities by employing a two-step verification process.

The above policies only represent a subset of the comprehensive measures adhering to and creating to ensure ScholarFace adheres to the highest ethical standards.

For example, the system includes measures to protect a scholar's personal information, such as name and contact information. There are mechanisms to protect name and contact information from outside of the ScholarFace system. In an embodiment, a measure is included to prevent an outsider from being able to use the app without getting registered and verified first. A further measure is that the system is prevented from identifying an unregistered scholar. Asides this, the system follows all standard strict security and encryption measures to protect the backend from unauthorized access.

Figure 10:
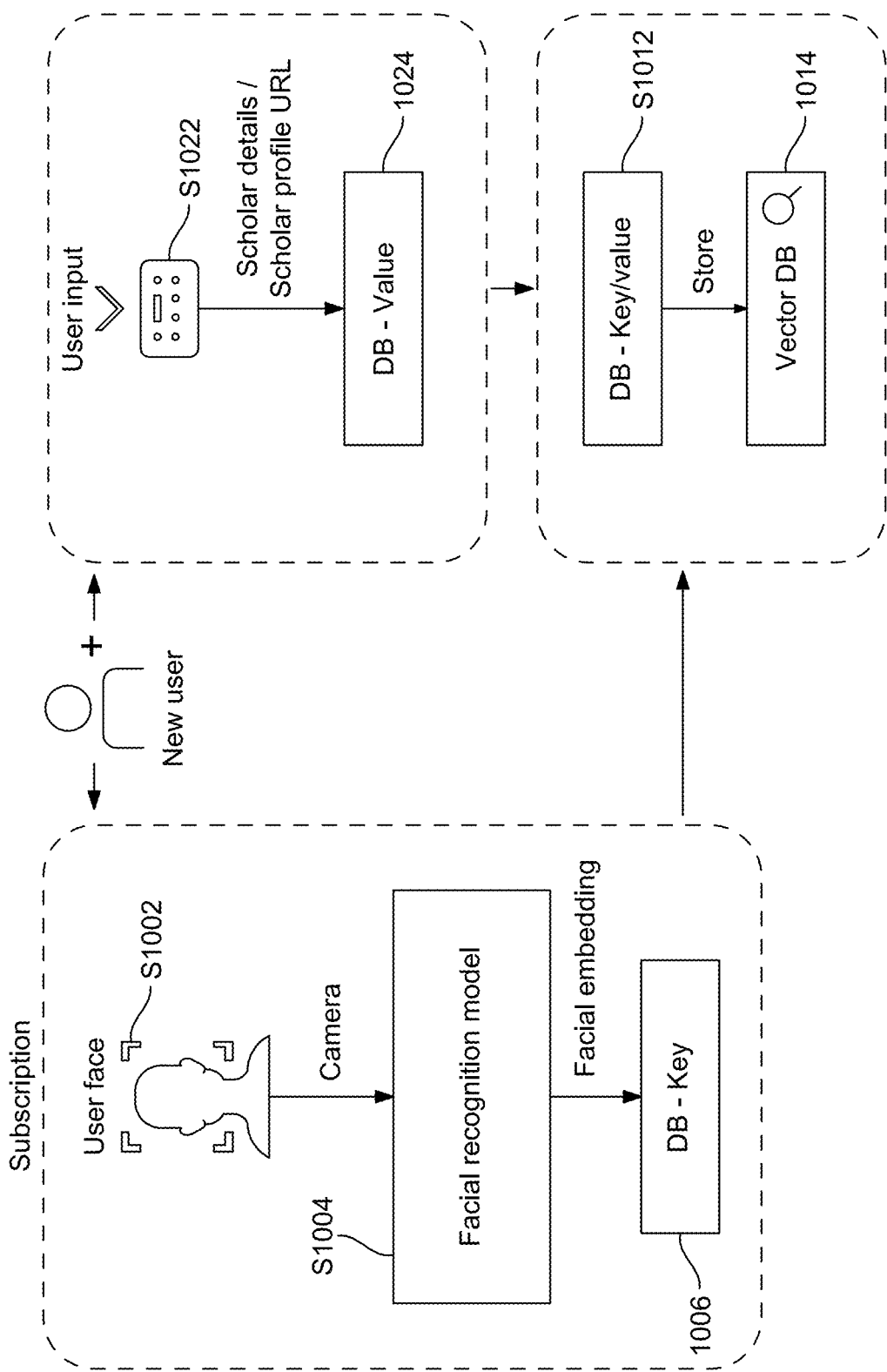
FIG. 10 is a flow diagram for creation of a scholar database, in accordance with an exemplary aspect of the disclosure.

ScholarFace utilizes a vector-indexed database (VectorDB) for efficient search and scholar information retrieval. FIG. 10 is a flow diagram for creation of the vector-indexed scholar database. As a part of a new user's registration, ScholarFace enables input of a scholar's face image, or, in S1002, capturing a face image using a camera, such as a built-in rear facing camera of a laptop computer or camera-equipped mobile device. In S1004, a face recognition deep learning network generates facial embeddings, and in S1006, stores the facial embeddings as a database key. Also as part of new user's registration, in S1022, ScholarFace provides input for scholar information details, including a URL for a Web page containing a scholar profile. In S1024, the scholar information details are stored as values for a scholar profile. The facial embeddings serve as the key for storing and retrieving scholar information stored in the VectorDB. Thus, in S1012, the facial embeddings, as a key, is stored in association with the scholar information details, as a value, in the vector database, in S1014.

In the previous subsections, a detailed overview of ScholarFace is provided. Now, its distinct advantages compared to existing systems. ScholarFace offers several unique benefits over commonly used indexed scholarly information retrieval platforms, including Google Scholar, Semantic Scholar, ResearchGate, and ORCID. These advantages are as follows.

Precise Scholar Identification: ScholarFace leverages advanced face recognition technology, ensuring accurate and reliable scholar identification. By minimizing the risk of ambiguity or misattribution of research work, ScholarFace provides a higher level of confidence in associating scholarly contributions with the right individuals.

Contextually Rich Summaries: Unlike other platforms such as Google Scholar, ORCID, and Semantic Scholar, ScholarFace generates comprehensive and contextually rich summaries using sophisticated language models. These in-depth insights give users a deeper understanding of scholars' academic achievements and contributions, enhancing the information retrieval experience.

Enhanced User Experience: ScholarFace prioritizes a streamlined user experience, offering an intuitive and user-friendly interface. Researchers can efficiently access and explore scholarly information, facilitating seamless and productive interactions with academic content.

Specialized Focus on Scholarly Information: While platforms like Google Scholar and Semantic Scholar provide vast databases across multiple domains, ScholarFace is dedicated solely to scholarly information retrieval and access to direct answers through LLM-powered conversations. This specialized approach caters to the specific needs of researchers, offering a dedicated and optimized platform for academic knowledge exploration.

Facilitating Collaboration and Networking: With its seamless access to detailed scholar profiles, ScholarFace fosters meaningful collaborations and networking opportunities within the academic community. Researchers can easily connect with scholars sharing similar interests and expertise, promoting knowledge exchange and facilitating potential research partnerships.

Continuous Improvement and Innovation: ScholarFace remains committed to ongoing improvement and enhancement. The system is a dynamic platform that continues to evolve through innovative features and feedback into a well-rounded system that meets the evolving needs of researchers. ScholarFace can be integrated with other systems, such as social media platforms and research databases, allowing users to access a wider range of information and collaborate with a diverse network of scholars. This commitment to constant refinement positions ScholarFace as a go-to application for information retrieval and collaborative scholarly endeavors.

By harnessing cutting-edge technologies and prioritizing user-centric design, ScholarFace aims to revolutionize scholarly information retrieval and empower researchers in their pursuit of knowledge and collaboration.

In an embodiment, the system leverages the GPT-3.5 model for the chat service. In one embodiment, ScholarFace is implemented using ArcFace for face recognition model and the Bing Chat API for a baseline large language model. Note that this embodiment is a non-limiting initial implementation, and other models may be implemented without departing from the disclosed functionalities of the system.

Figure 11:
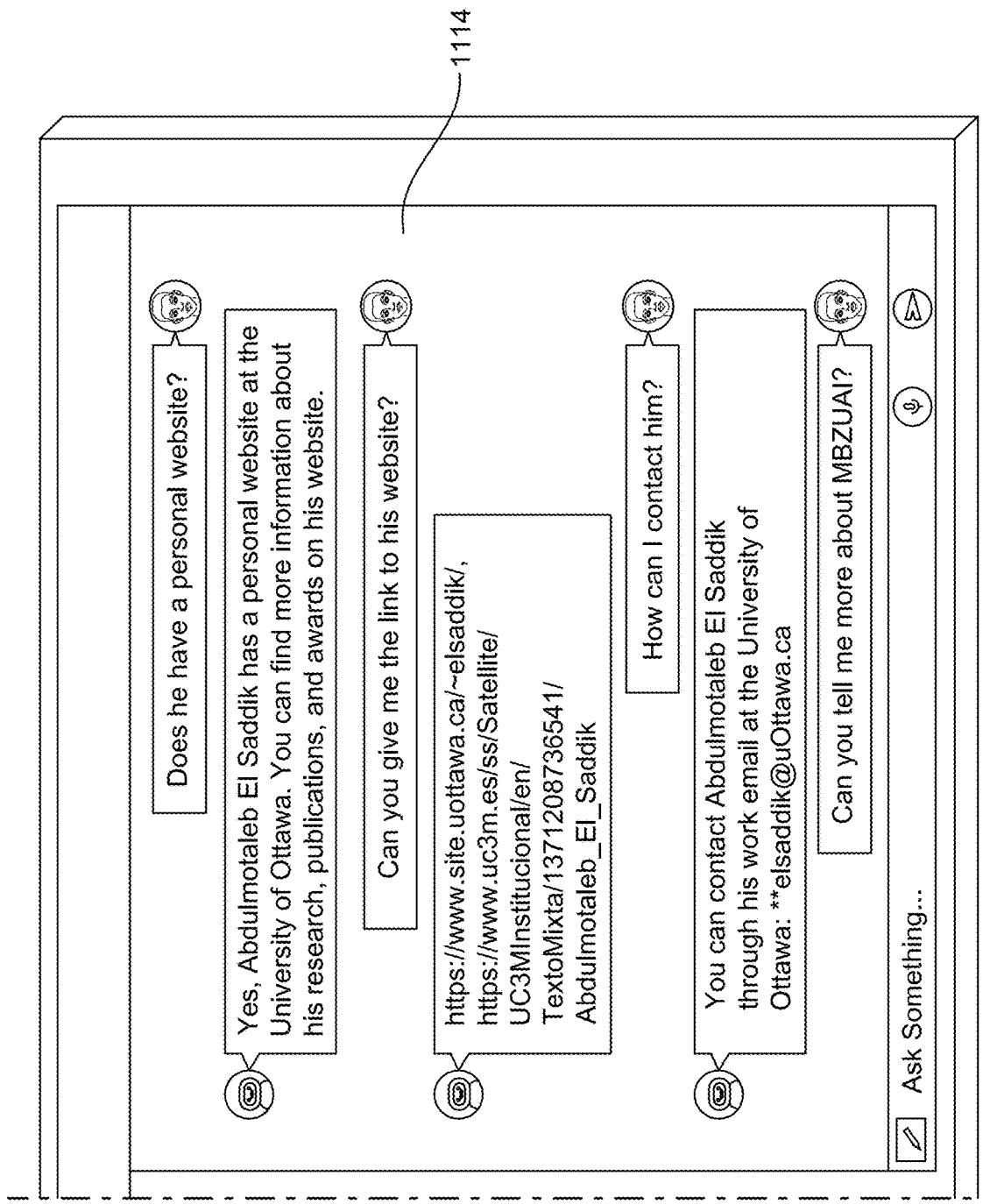
FIG. 11 is an exemplary display screen for the scholar scanning and information discovering.

FIG. 11 is an exemplary display screen for the ScholarFace Prototype. The exemplary display screen illustrates a state of interaction with the ScholarFace system. The exemplary display screen 1102 includes a generated scholar profile summary 1112 and a chat session 1114. In addition, the exemplary display screen 1102 contains an optional photo of the scholar, the scholar's name and affiliation 1106, and a link 1108 to more detailed information about the scholar. The vectorDB stores only information for registered scholars. In one embodiment, when a face image is not for a registered scholar, ScholarFace will display a message indicating that a scholar face image could not be recognized or is for a scholar that has not yet registered in the system.

The scholar summary 1112 is generated by a large language model that has been fine tuned to generate summaries of textual content. The textual content is retrieved from the vectorDB, described above, based on a facial embedding generated from an image of the scholar.

The chat session 1114 takes the form of question-answer, where questions are typed in by a user, and the answers are generated by a large language model that has been fine tuned for generating answers to questions.

To demonstrate the feasibility of ScholarFace, a proof-of-concept evaluation is conducted using state-of-the-art (SOTA) face recognition models on carefully curated datasets. It is essential to note that this evaluation does not finalize the selection of a specific face recognition model for ScholarFace. In this section, the datasets, evaluations, and a conceptual display of the basic prowess of ScholarFace is described.

Datasets: Face recognition models listed in Table 1 have been evaluated to provide valuable insights into their performance, and are divided into two distinct datasets: LFW (Labeled Faces in the Wild Home) [7] and MBZUAI-F. The MBZUAI-F dataset comprises face images of 149 MBZUAI (Mohamed bin Zayed University of Artificial Intelligence) researchers, with an additional test dataset containing 79 distinct images of the same individuals from the dataset. Careful curation ensures the absence of duplicate images and an equal representation of all demographics.

Table 1 shows assessment results of state-of-the-art face recognition models, including VGG-Face, FaceNet, FaceNet-512, DeepFace, and ArcFace. Additionally, two ensemble techniques, Majority and Weighted, are assessed that combine all models except DeepFace. The Majority ensemble technique selects the final result through voting, while Weighted ensemble assigns weighted scores to each model and selects the outcome with the highest weight. Performance is evaluated on two datasets: LFW (Labeled Faces in the Wild Home) and MBZUAI-F, which contains face images of 79 MBZUAI (Mohamed bin Zayed University of Artificial Intelligence) researchers. Latency represents the average time taken for each test image.

TABLE 1

Performance Evaluation of Face Recognition Models.

| Model | LFW(%) | MBZUAI-F(%) | Latency(s) |
| --- | --- | --- | --- |
| VGG-Face | 98.8 | 65.8 | 0.70 |
| FaceNet | 99.2 | 72.2 | 0.42 |
| FaceNet-512 | 99.7 | 55.7 | 0.47 |
| Deepface | 97.4 | 21.5 | 1.19 |
| Arcface | 99.4 | 82.3 | 0.44 |
| Majority | | 82.3 | 1.45 |
| Weighted | | 82.3 | 1.63 |

Among the individual face recognition models, FaceNet-512 emerges as the top performer on LFW, achieving an impressive accuracy of 99.7%. This model outperforms other models, including VGG-Face and Arcface, which still demonstrate remarkable performance with accuracies above 98%.

On the MBZUAI-F dataset, Arcface stands out with the highest accuracy of 82.3%, while FaceNet also demonstrates competitive performance with an accuracy of 72.2%.

Incorporating ensemble techniques, the Majority and Weighted methods, combine all models except DeepFace. Both ensemble techniques yield identical accuracies of 82.3% on the MBZUAI-F dataset, demonstrating the potential of ensemble approaches to enhance recognition performance.

Considering the trade-off between accuracy and latency, VGG-Face and Arcface showcase efficient inference times of 0.7 seconds and 0.4 seconds per test image, respectively. On the other hand, Deepface exhibits a slightly higher latency of 1.2 seconds, indicating potential for use in real-time applications.

This evaluation sheds light on the strengths and limitations of various face recognition models, emphasizing the significance of model selection based on specific application requirements. The performance disparities observed on different datasets underscore the need for continuous improvement and adaptation of face recognition systems to suit diverse use cases within artificial intelligence and academia.

Figure 12:
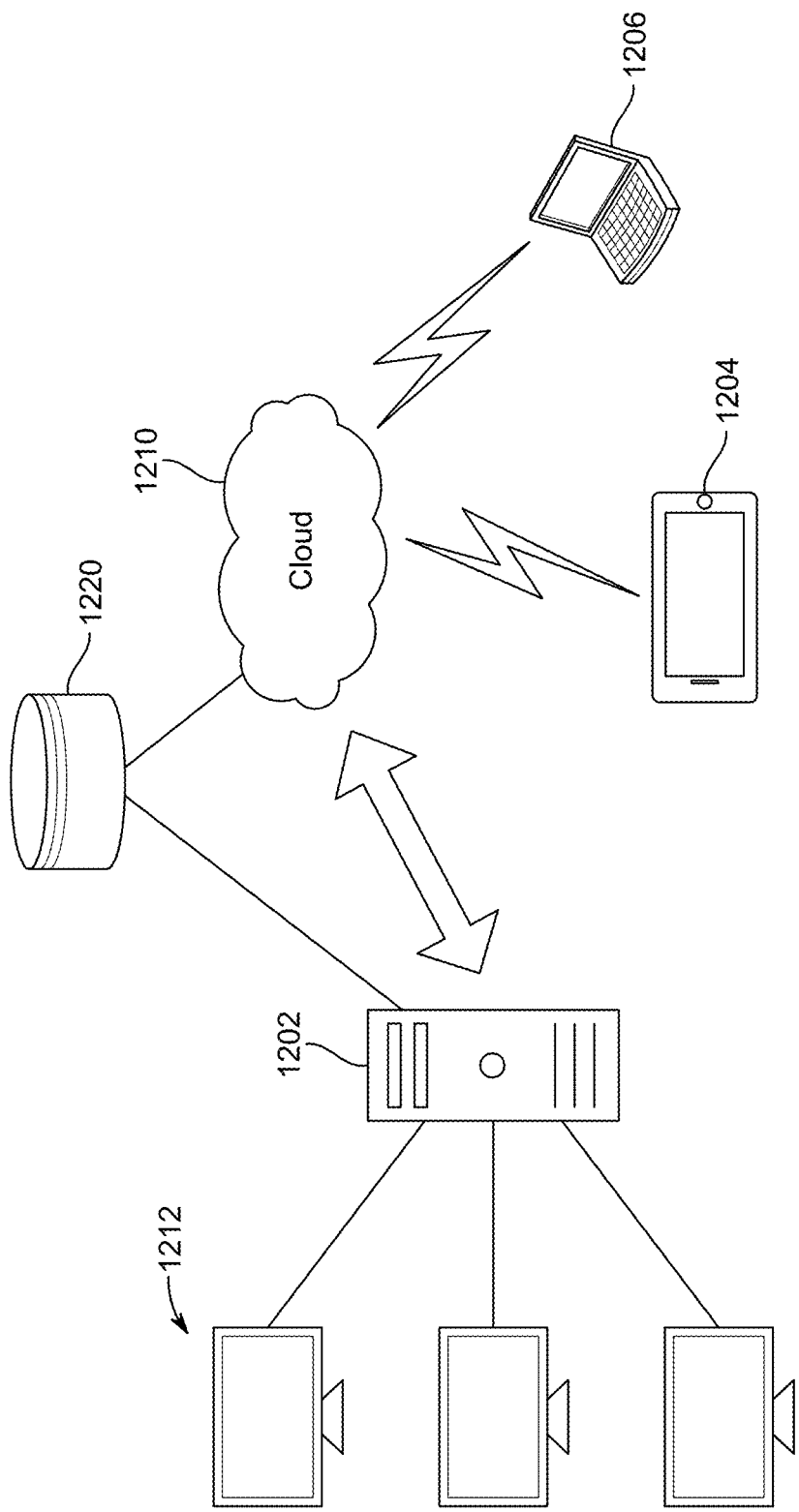
FIG. 12 is a system diagram for training a face recognition model and large language models.

FIG. 12 is a system diagram for user registration and for training a face recognition model and large language models. New users may register in the ScholarFace system using terminals 1212. A server 1202 may be configured with server-side software for managing the user registration process and storage of registration information in a database 1220. The server 1202 can also be configured with a face recognition model and large language model. Alternatively, the face recognition model and large language model may be implemented in a cloud service 1220, such as Amazon Web Services or the like. The server 1202 may also be used for training the face recognition model for generating face embeddings from facial images, for training the large language model for summarization of scholar profiles, and for training the large language model for question-answer chat in the context of scholar information.

ScholarFace may be accessed by other users via a camera-equipped mobile device 1204 or stand-alone camera for video camera. Depending on the mobile device type, the mobile device can download an App including the facial recognition model and large language models to render and display a user interface screen, such as that shown in FIG. 11. In one embodiment, an image captured by the mobile device 1204 can be transmitted to a cloud service 1210 or to an external computing device, such as a laptop computer 1206, for performing image recognition, summarization, and chat functions of ScholarFace.

Figure 13:
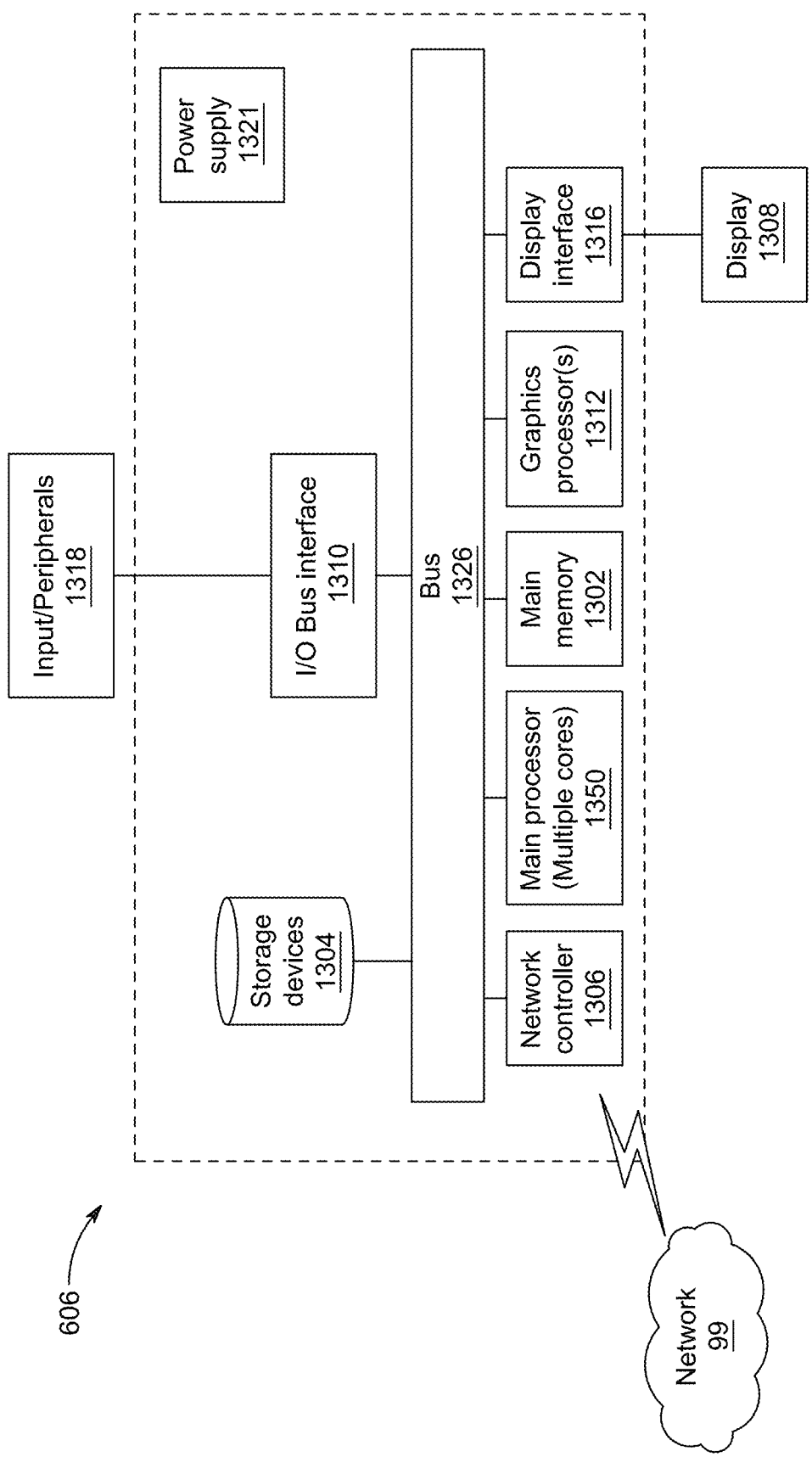
FIG. 13 is a block diagram of an exemplary workstation computer for performing the training.

FIG. 13 is a block diagram of an exemplary workstation computer for performing the training. The server 1202 (see also 306 in FIG. 3) can be a workstation configured with processing circuitry for artificial intelligence (AI) development, such as NVIDIA A100.

Referring to FIG. 13, the computer system may be an AI workstation running an operating system, for example Ubuntu Linux OS, Windows, a version of Unix OS, or Mac OS. The computer system 1300 may include one or more central processing units (CPU) 1350 having multiple cores. The computer system 1300 may include a graphics board 1312 having multiple GPUs, each GPU having GPU memory. The graphics board 1312 may perform many of the mathematical operations of the disclosed machine learning methods. The computer system 1300 includes main memory 1302, typically random access memory RAM, which contains the software being executed by the processing cores 1350 and GPUs 1312, as well as a non-volatile storage device 1304 for storing data and the software programs. Several interfaces for interacting with the computer system 1300 may be provided, including an I/O Bus Interface 1310, Input/Peripherals 1318 such as a keyboard, touch pad, mouse, Display Adapter 1316 and one or more Displays 1308, and a Network Controller 1306 to enable wired or wireless communication through a network 99. The interfaces, memory and processors may communicate over the system bus 1326. The computer system 1300 includes a power supply 1321, which may be a redundant power supply.

In some embodiments, the computer system 1300 may include a server CPU and a graphics card by NVIDIA, in which the GPUs have multiple CUDA cores. In some embodiments, the computer system 1300 may include a machine learning engine 1312.

Figure 14:
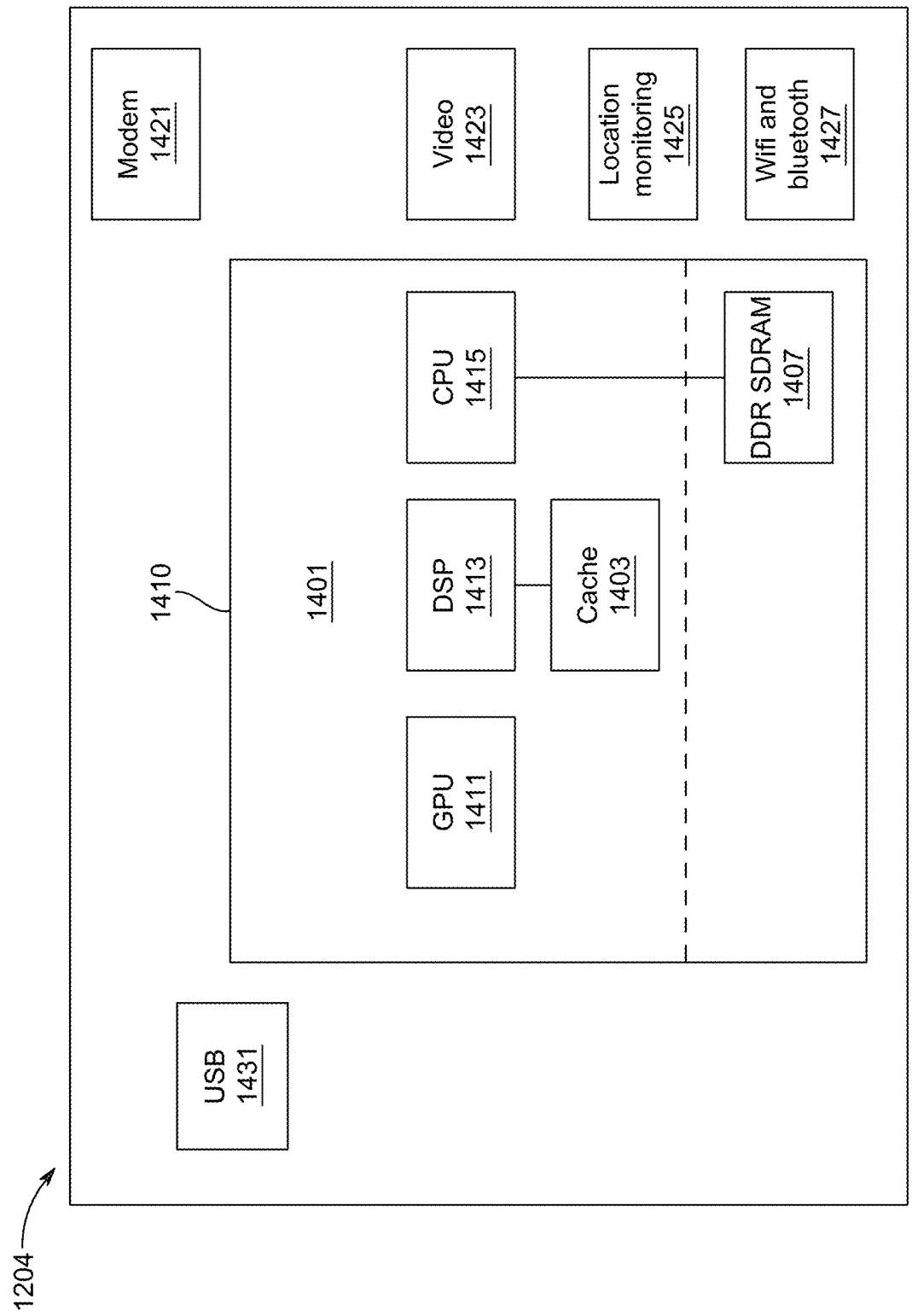
FIG. 14 is a block diagram of an exemplary camera-equipped mobile device.

FIG. 14 is a block diagram of an exemplary camera-equipped mobile device. As a minimum, the mobile device is equipped with at least one camera, such as a CCD solid-state image capture circuit. In some embodiments, the mobile device may be implemented with advanced computing processing circuitry that includes circuitry for AI and machine learning tasks. For example, android mobile smartphones are equipped with advanced system-on-chip (SoC) processors that include several types of processing circuitry built into a single semiconductor chip. Apple currently includes their own SoC processors in their latest smartphones.

Referring to FIG. 14, the camera-equipped mobile device 1401 provides support for simultaneous camera sensor inputs, video decoding and playback, location services, wireless communications, and cellular services. The mobile device 1401 includes a central processing unit (CPU) 1415, and may include a graphics processing unit (GPU) 1411 and a digital signal processor (DSP) 1413. The CPU 1415 may include a memory, which may be any of several types of volatile memory 1407, including RAM, SDRAM, DDR SDRAM, to name a few. The DSP 1413 may include one or more dedicated caches 1403 in order to perform computer vision functions as well as machine learning functions. The GPU 1411 performs graphics processing for a 4K resolution display device. The GPU 1411, DSP 1413, CPU 1415, Cache 1403, and in some embodiments, a cellular modem 1421, may all be contained in a single system-on-chip (SOC) 1401. The mobile device 1401 may also include video processing circuitry 1423 for video decoding and playback, location service circuitry 1425, including GPS and dead reckoning, and connectivity service circuitry 1427, including WiFi and Bluetooth. The mobile device 1401 may include one or more input/output ports, including USB connector(s) 1431, such as connectors for USB 2, USB 3, etc.

The ScholarFace system is an integration of face recognition algorithms and generative language models for academia/research purposes. The system processes diverse facial appearances and generates contextually rich scholarly information while ensuring that the highest ethical standards are met.

ScholarFace is a tool with tremendous potential for students and researchers, both in academic and industrial settings. The responsible application of this technology can optimize networking and collaboration, fostering a more connected and informed global scholarly community.

ScholarFace provides a seamless approach to accessing scholarly information. The system is an advanced academic search engine that upholds the highest ethical standards.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A scholar information retrieval system, comprising:
a memory storing facial embedding vectors and associated scholar information; and
processing circuitry configured to
input a face image of a scholar,
recognize, by a facial recognition model, the face image and generate a live facial embedding,
using the live facial embedding to search in the memory to identify a matching facial embedding vector,
based on the matching facial embedding vector, determine a textual academic summary for the scholar, and
display the textual academic summary for the scholar,
wherein for each facial embedding vector, the associated scholar information includes a name, an affiliation, and a link to a webpage,
and wherein the textual academic summary for the scholar is determined by:
based on the name and the affiliation that correspond to the matching facial embedding vector, determining whether there is an available textual academic summary in a cache for storing textual academic summaries generated in a predefined time period,
upon a determination that there is the available textual academic summary in the cache, obtaining the available textual academic summary, as the textual academic summary for the scholar, and
upon a determination that there is no available textual academic summary in the cache, using the link to the webpage that corresponds to the matching facial embedding vector to generate a textual academic summary, as the textual academic summary for the scholar.

2. The system of claim 1, wherein the processing circuitry is further configured to use the link to the webpage to generate the textual academic summary that corresponds to the matching facial embedding vector by:
obtain, by a Web crawler, content contained in the webpage, and
generate, by a large language model, the textual academic summary using the obtained content.

3. The system of claim 2, wherein the processing circuitry is further configured to
conduct, by a large language model for chat, a question-answer interaction with a user, wherein answers are generated by the large learning model based on the obtained content.

4. The system of claim 1, further comprising a camera for temporarily capturing a face image of a scholar;
wherein the processing circuitry is further configured to recognize, by the facial recognition model, the face image directly captured by the camera, and generate the live facial embedding, and
wherein the processing circuitry deletes the face image immediately after generation of the live facial embedding.

5. The system of claim 1, wherein the scholar information associated with the facial embedding vectors is periodically updated.

6. The system of claim 1, wherein the memory stores the facial embedding vectors and the associated scholar information in a database,
wherein the processing circuitry is further configured to extract, by a user registration module, the facial embedding for a scholar face image to serve as a search key in the database.

7. The system of claim 1, further comprising:
a scholar imaging system for creating a database of scholar information, including
a camera for capturing an image of a scholar's face;
a machine learning engine for generating a facial embedding vector using a facial recognition model on the face image; and
the memory for storing the facial embedding vector.

8. The system of claim 7, further comprising:
a scholar profile database creation tool, including
an input for receiving the scholar information,
the processing circuitry configured to associate the scholar information with the facial embedding, and
storing the scholar information and the associated facial embedding in the database.

9. The system of claim 8, further comprising:
a scholar registration interface for registering a new scholar,
wherein the new scholar registering includes capturing, by a camera, an image of the new scholar's face,
and inputting information about the new scholar, including inputting a name and an affiliation.

10. The system of claim 9, wherein the inputting information about the new scholar further includes inputting a link to a webpage.

11. A non-transitory computer-readable storage medium including computer executable instructions, wherein the instructions, when executed by a computer, cause the computer to perform a method for scholar information retrieval in a mobile device, the method comprising:
storing, in a memory, facial embedding vectors and associated scholar information;
inputting a face image of a scholar;
recognizing, by a facial recognition model, the face image and generate a live facial embedding;
using the live facial embedding to search in the memory to identify a matching facial embedding vector;
based on the matching facial embedding vector, determining a textual academic summary for the scholar; and
displaying the textual academic summary for the scholar wherein for each facial embedding vector, the associated scholar information includes a name, an affiliation, and a link to a webpage,
and wherein the step of determining the textual academic summary for the scholar further comprises:
based on the name and the affiliation that correspond to the matching facial embedding vector, determining whether there is an available textual academic summary in a cache for storing textual academic summaries generated in a predefined time period,
upon a determination that there is the available textual academic summary in the cache, obtaining the available textual academic summary, as the textual academic summary for the scholar, and
upon a determination that there is no available textual academic summary in the cache, using the link to the webpage that corresponds to the matching facial embedding vector to generate a textual academic summary, as the textual academic summary for the scholar.

12. The computer-readable storage medium of claim 11, wherein the step of using the link to the webpage that corresponds to the matching facial embedding vector to generate the textual academic summary further comprises:
obtaining, by a Web crawler, content contained in the webpage, and
generating, by a large language model, the textual academic summary using the obtained content.

13. The computer-readable storage medium of claim 12, further comprising
conducting, by a large language model for chat, a question-answer interaction with a user, wherein answers are generated by the large learning model based on the obtained content.

14. The computer-readable storage medium of claim 11, further comprising:
temporarily capturing, via a camera, a face image of a scholar;
recognizing, by the facial recognition model, the face image directly captured by the camera, and generate the live facial embedding; and
discarding the face image immediately after generation of the live facial embedding.

15. The computer-readable storage medium of claim 11, further comprising periodically updating the scholar information associated with the facial embedding vectors.

16. The computer-readable storage medium of claim 11, further comprising storing the facial embedding vectors and the associated scholar information in a database, and extracting, by a user registration module, the facial embedding for a scholar face image to serve as a search key in the database.

17. The computer-readable storage medium of claim 11, further comprising:
creating a vector database of scholar information, including
capturing, via a camera, an image of a scholar's face;
generating, via a machine learning engine, a facial embedding vector using a facial recognition model on the face image; and
storing the facial embedding in a local memory.

18. The computer-readable storage medium of claim 17, further comprising:
a scholar profile database creation tool, including
receiving scholar information;
associating the scholar information with the stored facial embedding; and storing the scholar information and the associated facial embedding in the vector database.

19. The computer-readable storage medium of claim 18, further comprising:
a scholar registration interface for registering a new scholar;
wherein the new scholar registering includes capturing, by a camera, an image of the scholar's face,
and inputting information about the new scholar, including inputting a name and an affiliation.

20. The computer-readable storage medium of claim 19, wherein the inputting information about the new scholar further includes inputting a link to a webpage.

\* \* \* \* \*